Figure 1:
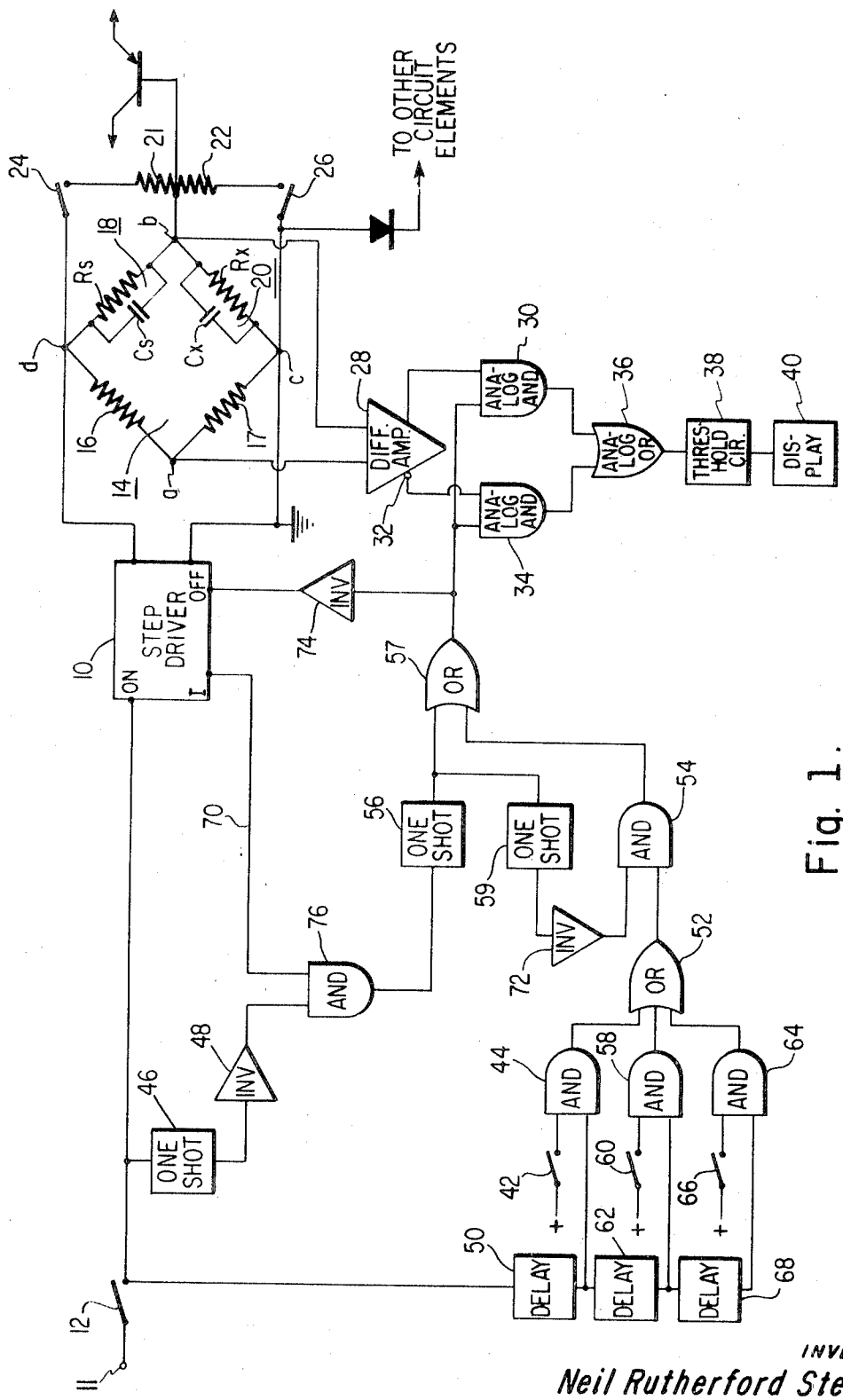

United States Patent

Stewart et al.

[15] 3,643,156
[45] Feb. 15, 1972

[54] PULSE-TYPE CIRCUIT ELEMENT-TESTING METHOD

[72] Inventors: Neil Rutherford Stewart, Cherry Hill; Donald Ray Preslar, Cinnaminson, both of N.J.

[73] Assignee: RCA Corporation

[22] Filed: June 5, 1969

[21] Appl. No.: 830,739

[52] U.S. Cl. .................................324/57 R, 235/151.31
[51] Int. Cl. .........................................G01r 27/00
[58] Field of Search..................324/57, 101, 102, 103, 76, 324/140, 57 B; 235/179, 151.31

[56] References Cited

UNITED STATES PATENTS

| | | | |
|---|---|---|---|
| 2,409,419 | 10/1946 | Christaldi | 324/57 |
| 2,633,019 | 3/1953 | Albrecht et al. | 324/57 X |
| 3,076,338 | 2/1963 | Peltola | 324/57 X |
| 3,120,630 | 2/1964 | Le Clear | 324/140 X |
| 3,440,530 | 4/1969 | Reich et al. | 324/62 |
| 2,574,470 | 11/1951 | Finney | 324/57 |

Primary Examiner—Edward E. Kubasiewicz
Attorney—Edward J. Norton

[57] ABSTRACT

A method is provided for testing one or more elements while in circuit by comparing the reaction of the element or elements to a step signal applied thereto to at least one discrete moment or time interval after the step signal has been applied.

13 Claims, 9 Drawing Figures

PLOT OF VOLTAGE ERROR VERSUS % TOLERANCE FOR INDUCTOR, RESISTOR AND CAPACITOR

WAVEFORMS FOR VARIOUS ERRORS IN $R_X$ AND $C_X$ FOR A RESISTOR CAPACITOR NETWORK

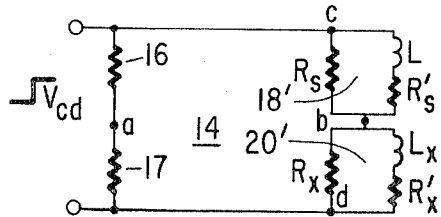

$$R_X = R_S(1+x_1)$$
$$L_X = L_S(1+x_3)$$
$$R'_X = R'_S(1+x'_1)$$

$$e_3 = \frac{x_3}{2(2+x_3)}V_{dc} \quad e_1 = \frac{x_1}{2(2+x_1)}V_{dc}$$
$$e'_1 = \frac{x'_1}{2(2+x'_1)}V_{dc}$$

Fig. 6.

$$x = \frac{\text{per cent error}}{100}$$

| CONDITIONS | $V_{bd}$ | $V_{ba} = V_{bd} - V_{ad}$ |
|---|---|---|
| (a) $R_X = R_S$, $L_X = L_S$, $R'_X = R'_S \approx 0$ | step to $V_{cd}/2$ | flat |
| (b) $R_X > R_S$, $L_X = L_S$, $R'_X = R'_S \approx 0$ | spike above $V_{cd}/2$ decaying | $e_1$ spike decaying down |
| (c) $R_X < R_S$, $L_X = L_S$, $R'_X = R'_S \approx 0$ | rising to $V_{cd}/2$ | $e_1$ dip rising |
| (d) $R_X = R_S$, $L_X > L_S$, $R'_X = R'_S \approx 0$ | rising to $V_{cd}/2$ | rising to $e_3$ |
| (e) $R_X = R_S$, $L_X < L_S$, $R'_X = R'_S \approx 0$ | spike above $V_{cd}/2$ decaying | decaying to $e_3$ |
| (f) $R_X > R_S$, $L_X > L_S$, $x_1 < x_3$, $R'_X = R'_S \approx 0$ | rising above $V_{cd}/2$ | $e_1$ rising to $e_3$ |
| (g) $R_X < R_S$, $L_X < L_S$, $x_1 > x_3$, $R'_X = R'_S \approx 0$ | rising to $V_{cd}/2$ | $e_1$ dip rising to $e_3$ |
| (h) $R_X > R_S$, $L_X < L_S$, $R'_X = R'_S \approx 0$ | spike decaying | $e_1$ decaying to $e_3$ |
| (i) $R_X < R_S$, $L_X > L_S$, $R'_X = R'_S \approx 0$ | rising to $V_{cd}/2$ | $e_1$ dip rising to $e_3$ |

WAVEFORMS FOR VARIOUS ERRORS IN $R_X$ AND $L_X$ FOR A RESISTOR INDUCTOR NETWORK WHERE $R'$ AND $R'_X$ ARE NEGLIGIBLE

INVENTOR
Neil Rutherford Stewart
and Donald Ray Preslar

BY Edward J Norton
ATTORNEY

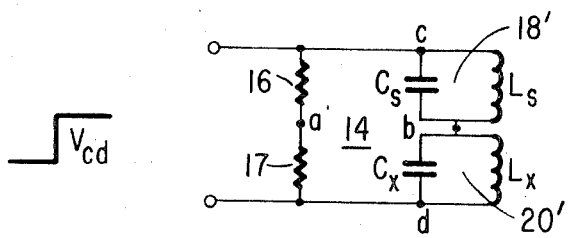

| CONDITIONS | $V_{bd}$ | $V_{ba} = V_{bd} - V_{ad}$ |
|---|---|---|
| (a) $R_x = R_s$<br>$L_x > L_s$, $x'_1 < x_3$<br>$R'_x > R'_s > 0$ | | |
| (b) $R_x > R_s$<br>$L_x < L_s$<br>$R'_x > R'_s > 0$ | | |

SHOWS THE DIFFERENT WAVEFORMS FOR VARIOUS
ERRORS IN $R_x$, $L_x$, AND $R'_x$ OF Fig. 6 WHERE $R'_x > 0$

Fig. 7

$e_2 = \frac{-x_2}{2(2+x_2)} V_{dc}$ $e_3 = \frac{x_3}{2(2+x_3)} V_{dc}$ $x = \frac{\text{percent error}}{100}$

| CONDITIONS | $V_{bd}$ | $V_{ba} = V_{bd} - V_{ad}$ |
|---|---|---|
| (a) $C_x = C_s$<br>$L_x > L_s$ | | |
| (b) $C_x = C_s$<br>$L_x < L_s$ | | |
| (c) $C_x > C_s$<br>$L_x = L_s$ | | |
| (d) $C_x < C_s$<br>$L_x = L_s$ | | |

DEPICTS VOLTAGE WAVEFORMS OF FOUR
EXAMPLES FOR THE INDUCTIVE-
CAPACITIVE CIRCUITS

Fig. 8.

$$e_2 = \frac{-x_2}{2(2+x_2)} V_{cd}$$

$$e_3 = \frac{x_3}{2(2+x_3)} V_{cd}$$

$$x = \frac{\text{percent error}}{100}$$

$$C_x = C_s(1+x_2)$$
$$L_x = L_s(1+x_3)$$

| CONDITIONS | $V_{bd}$ | $V_{ba} = V_{bd} - V_{ad}$ |
|---|---|---|
| (a) $C_x = C_s$, $L_x > L_s$, $R_x = R_s$ | | |
| (b) $C_x = C_s$, $L_x < L_s$, $R_x = R_s$ | | |
| (c) $C_x > C_s$, $L_x = L_s$, $R_x = R_s$ | | |
| (d) $C_x < C_s$, $L_x = L_s$, $R_x = R_s$ | | |

SHOWS THE VOLTAGE WAVEFORMS FOR FOUR EXAMPLES THE INDUCTIVE-CAPACITIVE-RESISTIVE CIRCUITS

PULSE-TYPE CIRCUIT ELEMENT-TESTING METHOD

This invention relates to a method of nondestructively testing one or more circuit elements while the elements are in a circuit.

When a circuit of the board type, for example, has been built, it is advantageous to test the circuit board in its completed form and without detaching or destroying any element thereof. Testing by supplying direct current to selected circuit portions on the board is not normally sufficient, since application of direct current to a board provides resistance tests but does not provide inductance or capacity tests. In testing inductance or capacity, time must be provided for applying several cycles of the sine wave to the board. Finding the values of the inductance and capacity by determining the resonant frequency of a circuit, in addition to requiring time and care, does not give good results since knowledge of a frequency does not give the values of the inductance or capacity but rather a measure of the square root of the product thereof. Also, the presence of resistance in the circuit may prevent a resonant effect from appearing. Furthermore, it is advantageous to determine whether the circuit that is being tested differs from a standard by an acceptable amount. That is, it is often more important to know whether a tested element is within tolerance than to know what its size is.

It is an object of this invention to provide a method which will indicate whether a resistance, an inductance or a capacity in a completed circuit is within an acceptable tolerance without changing the circuit and without doing it harm.

A portion of a circuit to be tested is connected as one arm of a bridge, and the same portion of another circuit which is accepted as a standard is included in another arm of the bridge. The other two arms of the bridge may be two equal resistors having a terminal in common. A step voltage, that is a voltage that jumps very quickly from one value to a different value and remains at the different value until the test is completed, is applied across the two resistors in series. The voltage during one or more discrete different moments or time intervals after the applied step voltage has arrived at its different voltage value, appearing between the junction of the two resistors and the junction of the circuit portion to be tested and the standard circuit portion is a measure of the percentage difference between the like elements in the circuit portion being tested. If desired, the measure voltage may be applied to a threshold device. If the measure voltage at the moment or time interval chosen does not exceed a predetermined threshold voltage, the element whose value is indicated by the measure voltage appearing at that moment is within tolerance. Also, if desired, the maximum value of the applied step voltage may be less than the forward threshold of conduction of transistors and diodes, for example, included in the complete circuit under test, whereby the diodes and transistors act to isolate portions of the complete circuit from other circuit portions.

Figure 2:
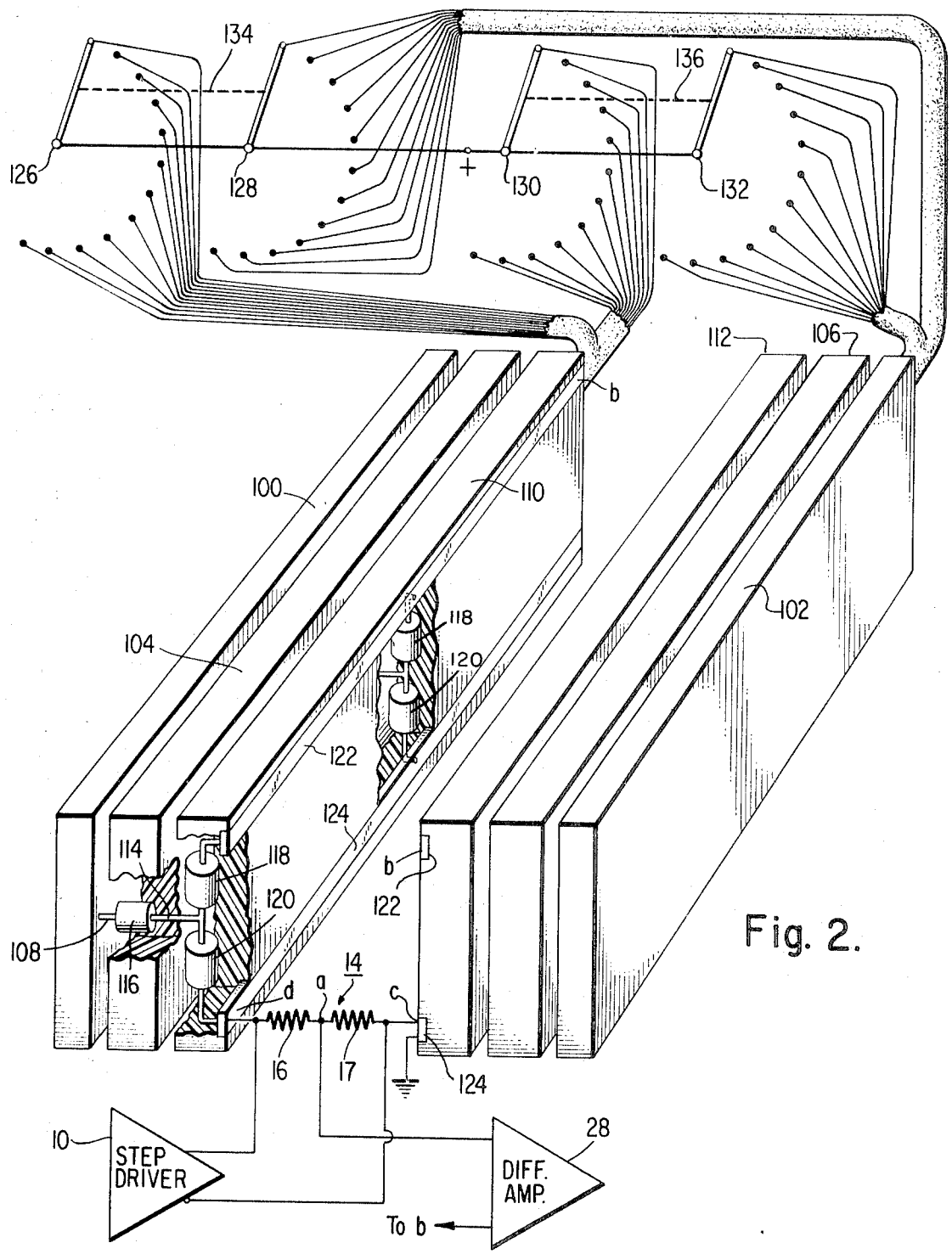

The invention will be better understood upon reading the following description when taken with the accompanying drawing in which FIG. 1 is a circuit diagram of an embodiment of the test circuit of this invention, FIG. 2 is a drawing which is partially diagrammatic and partially a circuit diagram illustrating how the circuit of FIG. 1 may be used, and FIGS 3-9 are various curves useful in explaining this invention.

Turning first to FIG. 1, upon closing a switch 12, a start DC signal supplied from a suitable source, not shown, at terminal 11 is applied to a step driver 10. The step driver 10 applies a step voltage, such as the voltage indicated as $V_{dc}$ in FIG. 3, across the diagonal terminals $c$ and $d$ of a bridge 14. The bridge 14 comprises two equal resistors 16 and 17 having one terminal $a$ in common and two impedances 18 and 20 having a terminal $b$ in common. The other ends of the resistors 16 and 17 are connected to the other ends of the impedances 18 and 20 and to the terminals $d$ and $c$, respectively. The terminals $c$ and $d$ comprise diagonal or input terminals, and the terminals $a$ and $b$ comprise the conjugate diagonal or output terminals of the bridge 14. For convenience, the terminal $c$ may be grounded. As shown in FIG. 1 merely as an example, the standard impedance 18 may comprise a resistor $R_s$ and a capacitor $C_s$ in parallel, and the unknown impedance 20 may comprise a resistor $R_x$ and a capacitor $C_x$ in parallel. While the value of $R_x$ or $C_x$ is not known, it is known that the circuit portions represented by the impedances 18 and 20 comprise similar circuit elements, similarly connected. The difference between the top and bottom value of the voltage step $V_{dc}$ of FIG. 3 which is applied by the step driver 10 to the diagonal terminals $c$ and $d$ of the bridge 14 may be a few tenths of a volt so that the diodes and the transistors (if any) comprising the circuits of which the impedances 18 and 20 represent respective portions, will isolate the impedance portions 18 and 20 from the remainder of the circuits containing these portions. Connections of the impedances 18 and 20 to a representative transistor and a diode are shown in FIG. 1 for illustrative purposes. A pair of equal resistors 21 and 22 whose junction is connected to the terminal $b$ of the bridge 14 is provided. The other terminals of the resistors 21 and 22 are connected to the terminals $d$ and $c$ of the bridge 14 as by respective switches 24 and 26 for a purpose to be explained.

Figure 3:
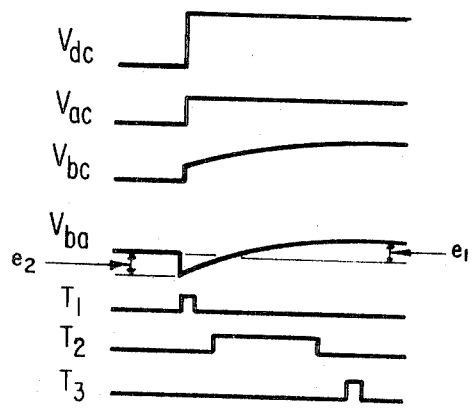

The portion of the circuit of FIG. 1 described above and comprising the elements 10 to 26 constitutes a means to produce an error wave such as the wave $V_{ba}$ of FIG. 3. Error wave $V_{ba}$ is produced when the value of known impedance 18 differs from the value of unknown impedance 20. Also significant about wave $V_{ba}$ is the fact that the type of impedance which affects the shape of wave $V_{ba}$ is a function of the time domain. That is, the portion of wave $V_{ba}$ which relates to capacitors $C_s$ and $C_x$ occurs at a time interval $T_1$ shown by voltage $e_2$ while the portion of wave $V_{ba}$ which relates to resistors $R_s$ and $R_x$ occurs at time interval $T_3$ shown by voltage $e_1$. More complex impedances relate to time interval $T_2$ in a manner to be described. As will be explained, the wave $V_{ba}$ may be sampled at intervals such as $T_1$, $T_2$, and $T_3$ (also indicated in FIG. 3) to indicate in percentage how much the various elements comprising the impedance 20 differs from the corresponding elements comprising the impedance 18. The portion of the circuit of FIG. 1 which includes the means for sampling the voltage $V_{ba}$ of FIG. 3 at various time intervals such as $T_1$, $T_2$, or $T_3$ will now be described.

A source of high or positive voltage is connected to one input of an AND-cirucit (hereinafter AND) 44 by way of a switch 42. A high is also applied by way of the switch 12 and by way of a delay circuit 50 to the other input terminal of the AND 44. The output of the AND 44 is applied to one input of an OR-circuit (hereinafter OR) 52. The output of the delay circuit 50 is applied through an additional delay circuit 62 to one input of an AND 58 and through still another delay circuit 68 to one input of an AND 64. High potential may be applied to the other input terminals of the ANDS 58 and 64 by respective switches 60 and 66. The outputs of the ANDS 58 and 64 are applied to additional individual input terminals of the OR 52. The output of the OR 52 is applied to an input of an AND 54.

Upon closing the switch 12, not only is a high applied to the delay 50 and the on terminal of the driver 10 but also a high is applied to a one-shot circuit (hereinafter ONE-SHOT) 46. The output of the ONE-SHOT 46 is applied by way of an inverter 48 to one input of an AND 76. When, as will be explained, during the operation the step driver 10, the output current thereof approaches (but has not yet reached) an unsafe value, a logical high voltage which indicates an unsafe condition and may be called an unsafe high is applied to the conductor 70 and a second input of AND 76 from the I output terminal of the step driver 10. The output of the AND 76 is fed to another ONE-SHOT 56. The output of the ONE-SHOT 56 is applied to a ONE-SHOT 59 and also to one input terminal of an OR 57. The output of the OR 57 is applied by way of an inverter 74 to the OFF terminal of the step driver 10 and also to one of the input terminals of each of the ANALOG ANDS 30 and 34. The output of the ONE-SHOT 59 is applied by way of an inverter 72 to one input of the AND 54, whose other input of connected to the output of the OR 52. The output of the AND 54 is connected to a second input of the OR 57.

A differential amplifier 28 is connected across the terminals $a$ and $b$ of the bridge 14. A noninverting output of the amplifier 28 is applied to a second input of the ANALOG AND 30 and an inverting output 32 of the differential amplifier 28 is applied to a second input of the ANALOG AND 34. The outputs of the ANALOG ANDS 30 and 34 are applied to respective inputs of an ANALOG OR 36, and the output of the ANALOG OR 36 is applied to a threshold circuit 38 whose output feeds a display device 40.

The operation of the bridge portion of the circuit of FIG. 1 will now be explained.

While any suitable circuit may be used for the step driver 10, the step driver 10 may comprise a flip-flop circuit whose output is low until a pulse is applied to its ON input. The output of the step driver 10 then goes high and remains high until an increasing voltage is applied to its OFF terminal. As noted above, a high appears at the output 1 from the step driver 10 when the current fed by the step driver 10 approaches an unsafe value. When the switch 12 is closed, a high is applied to the ON terminal of the step driver 10 whereby a step voltage such as $V_{dc}$ of FIG. 3 is applied across the diagonals terminals $d$ and $c$ of the bridge circuit 14. A voltage such as the voltage $V_{ac}$ appears across the terminals $a$ and $c$ and a similar voltage appears across the terminals $d$ and $a$ of the bridge 14. If the elements comprising the impedances 18 and 20 are of identical value (as well as being identically connected), the voltage across the conjugate diagonal terminals $b$ and $a$ of the bridge 14 would be zero. However, it is assumed that the impedances 18 and 20 are not identical but that unknown resistor $R_x$ is larger than the known resistor $R_s$, and that the unknown capacitor $C_x$ is larger than the known capacitor $C_s$. While the voltage appearing across the impedance 20 looks like the curve $V_{bc}$ of FIG. 3, the voltage appearing across the impedance 18 (not illustrated) is such that the voltage appearing across the terminals $a$ and $b$ of the bridge 14 is in the form of the error voltage curve $V_{ba}$ of FIG. 3. The polarity of the curve $V_{ba}$ immediately after the step portion of the voltage $V_{dc}$ is applied to the bridge 14, that is, during the time interval $T_1$, indicates whether $C_x$ is larger or smaller than $C_s$ and the value of the voltage $V_{ba}$ during the time interval $T_1$ indicates by what percent $C_x$ is larger or smaller than $C_s$. Similarly, at a time $T_3$, after the transients due to the presence of the capacitor $C_s$ or $C_x$ have subsided, the polarity of the wave $V_{ba}$ indicates whether resistor $R_x$ is larger or smaller than $R_s$ and the value of the voltage $V_{ba}$ during the time interval $T_3$ indicates by what percentage $R_x$ is larger or smaller than $R_s$.

It is noted that the absolute value of the resistance $R_x$ or the capacitor $C_x$ is not indicated by the shape of the curve $V_{ba}$, but the percentage difference of the values thereof with respect to the values of resistance $R_s$ or the capacitor $C_s$ is indicated. It can be shown mathematically that whether the unknown be an inductor, a resistor or a capacitor, the amplitude of various portions of the curve $V_{ba}$ which is produced when a voltage $V_{dc}$ is applied to the bridge 14 is a measure of the percentage difference between the corresponding unknowns and standards and is independent of the actual value thereof.

For example, examine the case in which the impedances 18 and 20 are solely resistors, where the standard and unknown resistors are $R_s$ and $R_x$, respectively. Let the unknown resistor $R_x$ be $x$ percent/100 different than the standard.

Therefore, (1) $R_x = R_s(1+x)$. Now, apply a voltage $V_{dc}$ across diagonal terminals $c$ and $d$. The voltage at $a$ with respect to $d$ will be (2) $V_{ad} = V_{dc}/2$ since resistors 16 and 17 are equal. Also, the voltage across terminals $b$ and $d$ is $$(3) \quad V_{bd} = \frac{Rx}{R_s + R_x} V_{dc}.$$

Substituting equation (1) into equation (3) results in $$(4) \quad V_{bd} = \frac{1+x}{2+x} V_{dc}.$$

The voltage at $b$ with respect to $a$, $V_{ba}$, is the error voltage (5) $V_{ba} = V_{bd} - V_{ad}$ and by substituting equations (2) and (4) into equation (5) results in error voltage $$V_{ba} = \left[\frac{1+x}{2+x} - \frac{1}{2}\right] V_{dc}$$

and, therefore $$(6) \quad V_{ba} = \frac{x}{2(2+x)} V_{dc}.$$

Equation (6) indicates that the error voltage is a function of the step voltage amplitude $V_{dc}$ and the out of tolerance amount $x$. It is clear that the error voltage is independent of the nominal value of the resistors $R_s$ and $R_x$. Similarly, it can be shown in the case where capacitors $C_s$ and $C_x$ are substituted for resistors $R_s$ and $R_x$, respectively, $$V_{bd} = \frac{C_s}{C_s + C_x} V_{dc}$$

which results in an error voltage $$V_{ba} = \frac{-x}{2(2+x)} V_{dc}.$$

In the case where resistor and capacitor components are in parallel, as illustrated in FIG. 1, it can be shown that the waveform $V_{ad}$ remains the same and the solution of the waveform $V_{bd}$ can be obtained by solving differential equations or by using laplace transforms. In particular, at time T equal to zero $$(8) \quad V_{bd_0} = \frac{C_s}{C_s + C_x} V_{dc}$$

and at time T equal to infinity $$(9) \quad V_{bd_\infty} = \frac{R_x}{R_s + R_x} V_{dc}.$$

Note that equations (8) and (9) are of the same form as equation (3). Therefore, the error voltage $V_{ba}$ at times zero and infinity will be of the form $X=/[2(2+x)]$ and the graph of FIG. 4 can be used for these times, the waveform of $V_{bd}$ and $V_{ad}$ between times zero and infinity being exponential.

At this point the operation of the remainder of the circuit of FIG. 1 will be explained. The delay circuits 50, 62, and 68 are of the oscillating type. That is, at a desired time interval after a high is applied to the input thereof, the output of the delays 50, 62, and 68 provide a positive or high pulse of a predetermined time duration. Then the output of the circuits 50, 62 and 68 go back to their low value. The ANDS 44, 54, 58, 64, and 76 act as switches in that when a high is applied to both inputs thereof the output thereof is high and otherwise the output thereof is low. The output of the OR's 52 and 57 in high if either input is high. Otherwise the output of the OR's 52 and 57 is low. Upon applying a high to the input of a ONE-SHOT 46, 56, or 59, a high immediately appear at its output and remains for a predetermined time after which the output of the ONE-SHOT 46, 56, or 59 goes back to low. When a high is applied to one input of an ANALOG AND 30 or 34, the output thereof depends on what is applied to the other input thereof. The output of the ANALOG OR 36 is at the highest level of the two inputs thereto.

Let it be assumed that the unknown circuit which has the form of the impedance 20 in FIG. 1 is to be tested against the standard circuit portion having the form of the impedance 18. The circuit portions 18 and 20 are inserted in the bridge 14 (as shown) as the arms thereof as by the apparatus of FIG. 2 which is to be explained. First, one only of the switches 42, 60, and 66 is closed. Let it be assumed that the switch 42 is closed, whereby a high is applied to one input of the AND 44. The switch 12 is then closed, causing the step driver 10 to apply a step voltage to the bridge terminals $d$ and $c$ and causing an immediate application of a low to one input terminal of the AND 76. Since the impedances 18 and 20 include capacitors, the step driver 10 must supply enough current to charge them whereby the I terminal of the step driver 10 may indicate an unsafe condition during capacitor charge time. However, since one of the inputs to the AND 76 is low for the short period of time (due to the operation of the ONE-SHOT 46) that it takes to charge the capacitors included in the circuits 18 and 20, the step driver 10 will charge these capacitors and will not be turned off during capacitor charge time, since the unsafe high (if any) at the I terminal of the step driver 10 cannot get through the AND 76 during the capacitor charging period. Closing the switch 12 also causes the oscillating delay 50 to apply a high pulse during the time $T_t$ to the other input of the AND 44 whereby a high is applied to one of the inputs of the OR 52, causing application of a high to one of the inputs of the AND 54. It is assumed that the circuit portions 18 and 20 have substantial ohmic resistance in both branches thereof whereby, after the capacitors included therein are charged, the step driver 10 does not provide high current. Therefore, after the output of the ONE-SHOT 46 has returned to its low value the conductor 70 is at low potential and the output of the AND 76 remains low. Since the output of the AND 76 is low, the other input of the AND 54 is high whereby a high is applied to one input of each of the ANALOG ANDS 30 and 34. Also, at the end of the $T_1$ time pulse the inverter 74 applies a step pulse which is in the voltage increasing direction to the OFF terminal of the step driver 10 to turn it off thereby to ready it for the next test.

A high corresponding to the time interval $T_1$ is applied to one input of both of the ANALOG ANDS 30 and 34 from the OR 57. During the interval $T_1$, if the noninverting output of the differential amplifier 28 is high, two highs are applied to the ANALOG AND 30, and if the inverting output 32 of the differential amplifier 28 is high during this time interval $T_1$, two highs are applied to the inputs of the ANALOG AND 34. Therefore, whether the voltage of the curve $V_{ba}$ is positive or negative during the interval $T_1$ (assuming that the impedances 18 and 20 are not identical) then a positive voltage is applied to the threshold circuit 38. If the voltage that is applied to the threshold circuit 38 is below a threshold corresponding to an acceptable tolerance, the voltage that is applied to the threshold circuit 38 does not get through to the display circuit 40 and the display circuit 40 will continue to indicate that the circuit portion corresponding to the impedance 20 is acceptable. Otherwise, if the voltage applied to the threshold circuit 38 is higher than the tolerance set thereinto, the display 40 will indicate that the capacitor $C_x$ is out of tolerance, although it will not be known whether the capacitor $C_x$ is too great or too small. If desired, the ANALOG ANDS 30 and 34 may go to separate threshold circuits such as 38 and separate displays such as 40 to show whether the unknown element is too great or too small.

Similarly, if the switches 42 and 66 are open and the switch 60 is closed before the switch 12 is closed, the portion of the voltage $V_{ba}$ appearing during the time interval $T_2$ is applied to the threshold circuit 38 upon closing the switch 12. It is noted that the interval $T_2$ is longer than the interval $T_1$ because, in certain instances the unknown impedance 20 may be a resonant circuit producing, upon application of a voltage such as $V_{dc}$ to the bridge 14, a voltage $V_{ba}$ of the form shown in the right-hand column of FIG. 8. The amplitude of the peaks of the voltage $V_{ba}$ of FIG. 8 if high enough to get through the display 40, indicate that the $C_x$ or the $L_x$ of the resonant circuit is out of tolerance. When testing a resonant LC circuit, the interval $T_2$ can be used, as explained above, for determining whether the capacitor $C_x$ or the inductor $L_x$ of the unknown circuit portion 20 is within tolerance provided that only $C_x$ or $L_x$, but not both, is different from the respective standard value $C_s$ or $L_s$.

Similarly, if the switches 42 and 60 are open and the switch 66 is closed before the switch 12 is closed a pulse $T_3$ is applied to the ANALOG AND circuits 30 and 34 upon closing the switch 12 whereby the voltage wave $V_{ba}$ is sampled at the time interval $T_3$ to determine if $R_x$ is within tolerance. To provide a general purpose tester (a tester to be used for testing components with a wide range of time responses), it is necessary to provide the capability of sampling the wave forms at many different time intervals. This may be done by making DELAYS 50, 62, and 68 variable so that their timing may be adaptable for permitting observance of produced wave forms during widely varying time periods.

Let it be assumed that the impedances 18 and 20 are removed from the circuit of FIG. 1 and a new standard impedance such as 18' of FIG. 6 is substituted for the impedance 18 in FIG. 1 and a new similar unknown impedance 20' is substituted for the impedance 20 of FIG. 1, the new impedances 18' and 20' each having a branch (the inductive branch for example) with little or no resistance, where $R'_s$ and $R'_x$ represent this minimal resistance. Then the current taken by the bridge 14 from the step driver 10 will increase without limit if the pulse or step voltage $V_{dc}$ applied to the bridge 14 continues for any length of time, causing damage or destruction of the circuit involved. The damage prevention circuit is now described. After a delay provided by the ONE-SHOT 46 upon the switch 12 being closed, one input (the left one as viewed in FIG. 1) of AND 76 goes high. Upon appearance of an unsafe high at the I terminal of the driver 10, both inputs of the AND 76 are high and its output is high. Immediately the ANALOG ANDS 30 and 34 have a pulse applied to one of their inputs for a time such as $T_4$ (not illustrated). As soon as this high ends the step driver 10 is turned off by applying a voltage which varies in a positive direction to its OFF terminal by the inverter 74 to prevent damage to the described means. Furthermore, for a delay equal to the delay produced by the ONE-SHOT 59, a low which is long enough to inhibit $T_1$, $T_2$, and $T_3$ is applied to an input of the AND 54 to prevent any time pulse $T_1$ or $T_2$, or $T_3$, which is produced by one of the switches 42 or 60 or 66 being closed when the switch 12 is closed, from arriving at the ANALOG ANDS 30 and 34. Therefore, the occurrence of an unsafe high at the I output of the step driver 10 at any time after the capacitor part (if any) of the circuits 18' or 20' are charged, causes immediate induction of what is happening in the bridge circuit and also turns off the step driver 10 to prevent damage thereto immediately after this indication.

It may happen that a circuit portion to be tested is resonant and provides very little damping whereby the oscillations continue for a long time. Such a circuit is illustrated in FIG. 8 and the use of the time interval $T_2$ has been mentioned hereinabove as a method of determining whether a reactive portion of the circuit of FIG. 8 is in or out of tolerance. THe use of the time interval $T_2$ gives a useful indication only when $C_x$ equals $C_s$ or $L_s$ equals $L_x$. As will be noted, errors in $C_x$ will be indicated during interval $T_1$. However, when $C_x$ is not equal to $C_s$ test cannot be made for L until the oscillations are damped out. To accomplish this, before switch 12 is closed, resistance is inserted in the tuned circuit by closing the switches 24 and 26. Then the time interval $T_3$ will occur after the oscillations are damped out and voltage curve $V_{ba}$ during time $T_3$ is a measure of the difference of inductance in the two resonant circuits being tested.

A means whereby various portions of circuits boards may be compared is shown in FIG. 2. Let the board 100 be the standard board and the board 102 be the unknown board, each of these boards having circuits mounted thereon in a known manner. These circuits have not been shown in FIG. 2 for clarity. A pair of contact boards 104 and 106 are provided, each contact board being of the same size and shape as the circuit boards 100 and 102. The contact boards 104 and 106 have a plurality of spring-pressed sharp-pointed contacts 108, only one being shown, extending therefrom towards the boards 100 and 102. These contacts 108 on the boards 104 and 106 are strategically positioned so that they contact the circuit boards 100 and 102 in such a manner that a circuit portion to be tested is connected between two contacts 108. Since many contacts 108 are provided other circuit portions may be connected between other contacts 108, however only the desired circuit portions will be selected as will be explained. Switchboards 100 and 112 are also provided each having contact 114 which extend towards and can be inserted into sockets 116 into which the contacts 108 may resiliently telescope. Each contact 114 is connected by way of respective magnetic reed switches 118 and 120 (one only being energized at the same time) to respective contact bars 122 and 124. Only one contact 114 and only four reed switches 118 and 120 are shown, however there may be as many contacts 114 as there are sockets 116 and there may be twice as many switches 118 and 120 as there are contacts 114. As is known, the reed switches 118 and 120 each comprises a solenoid surrounding a pair of contacts which are normally opened and which are closed upon passing current through the solenoid. One terminal of each of the solenoids on each of the boards 110 and 112 is grounded and the other terminal of the solenoids are connected to respective switch contacts of switches 126, 128, 130 and 132. The upper solenoids as viewed in FIG. 2 of the board 110 are connected to the contacts of the switch 126. The lower solenoids of the board 110 are connected to the contacts of the switch 130. The upper solenoids (not shown) of the board 112 are connected to the contacts of the solenoid 128 and the lower solenoids (not shown) of the board 112 are connected to the contacts of the switch 132. The switches 126 and 128 may be uncontrolled and the switches 130 and 132 may be uncontrolled as indicated by the dotted lines 134 and 136 respectively. Therefore, by proper manipulation of the switches 126, 128, 130, and 132, the same elements on each of the boards 100 and 102 may respectively be connected between the contact bars 122 and 124 of the switchboards 110 and 112. As illustrated, the contact bars 124 of the switchboards 110 and 112 are respectively terminals $d$ and $c$ of the bridge 14 and the contact bars 122 of the switchboards 110 and 112 and the terminal $b$ of the bridge 14. The terminal $a$ of the bridge 14 is the point between the resistors 16 and 17, the resistors 16 and 17 being connected between the points $d$ and $c$ of the bridge 14. Therefore, several circuit portions to be tested can be connected into the bridge 14 by manipulation of the several switches 126, 128, 130, and 132.

Figure 4:
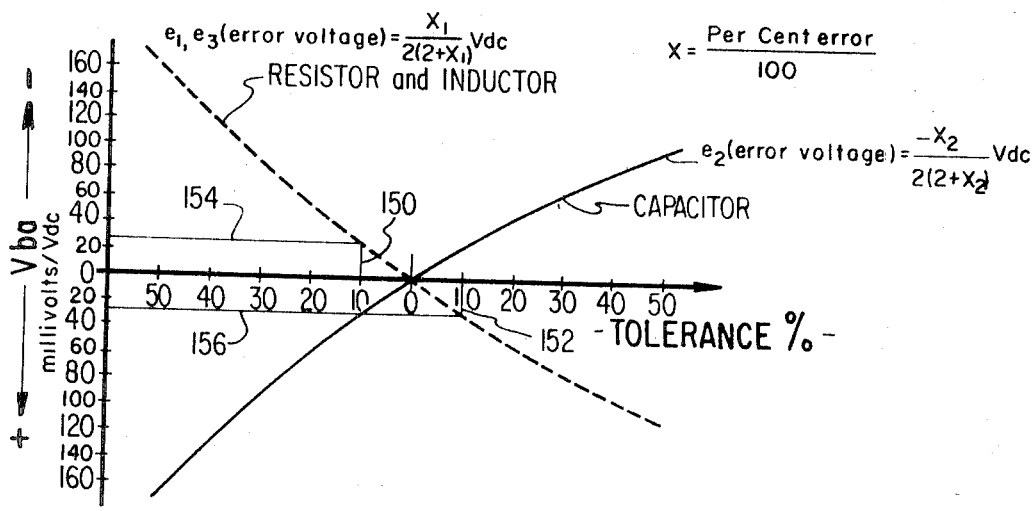

FIG. 4 shows the percent tolerance, that is the percent by which the unknown element of a circuit portion to be tested varies from the corresponding known element for capacitance, resistance and inductance plotted against the error voltage $V_{ba}$ in millivolts per volt of input step voltage $V_{dc}$ when the step voltage $V_{dc}$ is applied across the bridge 14. Let it be assumed that a 10-percent tolerance is permissible for the resistive portions of the circuits to be tested. Vertical lines 150 and 152 may be drawn through the 10-percent tolerance point for resistances and horizontal lines 154 and 156 may be drawn through where each vertical line 150 and 152 crosses the resistance curve. The threshold set into the threshold device 38 may be equal to the lower absolute value of the voltage represented by the lines 154 and 156, whereby for any value of voltage during a time interval $T_3$, the threshold device 38 will pass a signal to the display 40 to indicate a board beyond acceptable tolerance limits only when the threshold is exceeded. Setting a threshold into the device 38 equal to the lesser voltage between zero and the line 154 or the line 156 may cause rejection of certain circuits whose tolerance is slightly better than 10 percent, still a circuit including an element whose tolerance is greater than 10 percent will be rejected. Similar tolerances can be set into the circuit 38 when inductances and capacities are tested during the time intervals such as $T_1$ or $T_3$ or the unillustrated time interval $T_4$. The threshold device 38 may be variable and automatically programmable so that any component can be tested to any tolerance.

Figure 5:
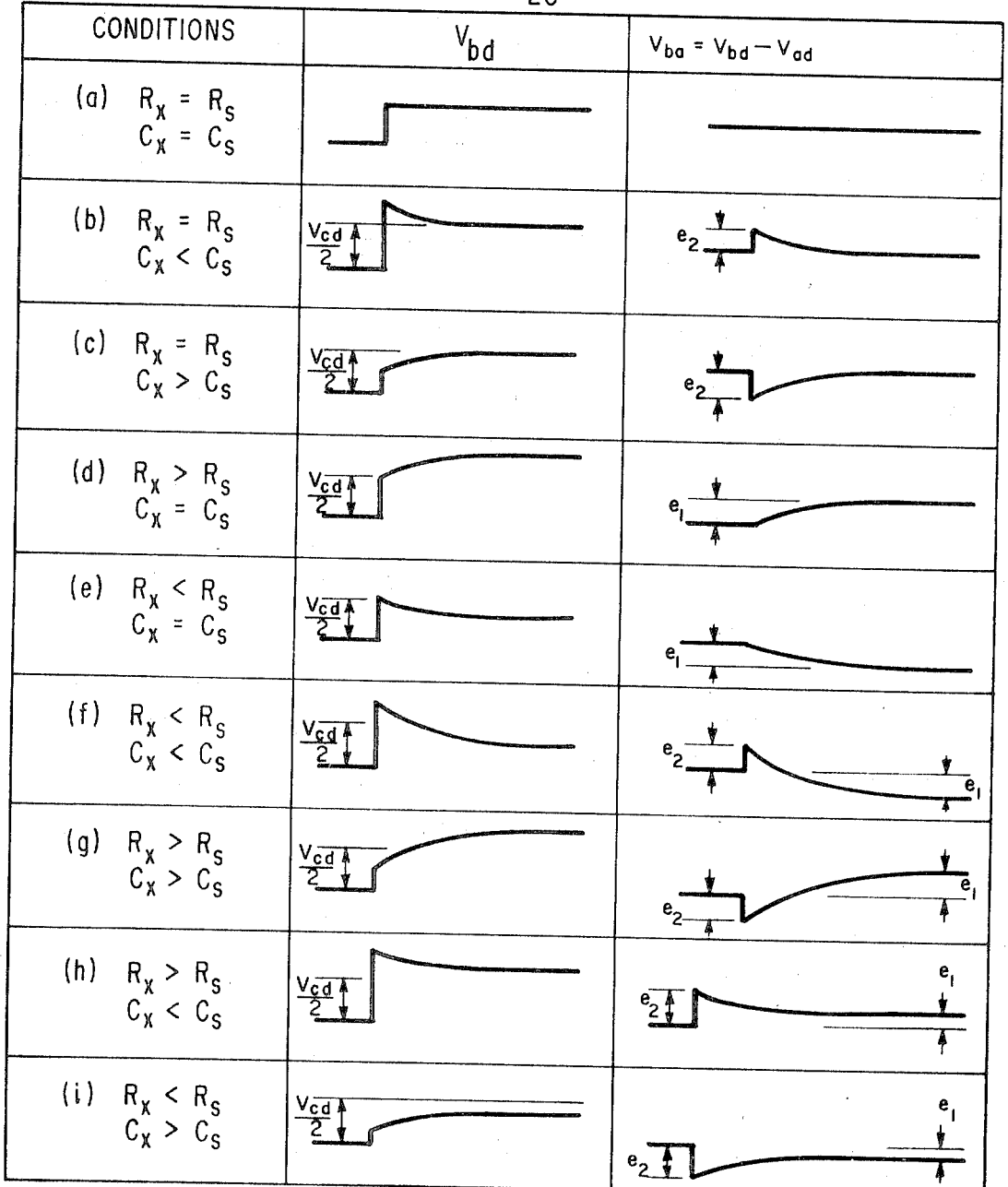
Figure 9:
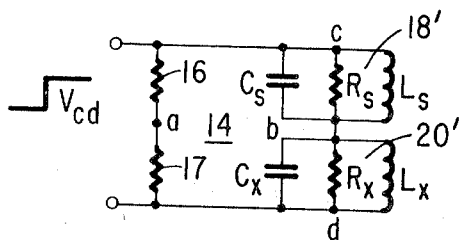

FIGS. 5 to 9 show the waveforms of voltages $V_{ba}$ applied to the differential amplifier 28 for various circuit portions and for various inaccuracies therein, when a step voltage is applied to the bridge 14 containing such circuit portions. For example, FIG. 1 in its present form shows a standard and an unknown parallel RC circuit. The waveforms of FIG. 5 are obtained by substituting impedances 18' and 20' respectively for the impedance 18 and 20 of FIG. 1. If the two parallel RC circuits are identical (FIG. 5a) the voltage $V_{ba}$ is zero. For various differences between these RC circuits, the amplitude and the polarity of the curve $V_{ba}$ immediately after the application of the step voltage, that is, at the time interval $T_1$, indicates whether $C_x$ is greater or less or equal to $C_s$ and what is the percent difference if any. At a later time, such as at time $T_3$, the polarity and amplitude of the wave $V_{ba}$ indicates whether $R_x$ is greater or less or equal to $R_x$ and what is the percent difference if any. It is thought that the method of measuring and the operation of the test circuit will be evident upon noting the several FIGS. 6 to 9 from this and the above explanation of the described circuit when the circuits 18' and 20' of FIGS. 6 to 9 are substituted for the impedances 18 and 20 of FIG. 1.

What is claimed is:

1. A method of comparing an unknown impedance with a known impedance, each of said impedances having a resistive and a reactive component, said method comprising:

providing first and second reference signals, said first reference signal manifesting the transient component of the known impedance and said second reference signal manifesting the steady-state component of the known impedance, applying a test signal to said unknown impedance to develop a resultant signal at said unknown impedance, said resultant signal having a transient and a steady-state component, said test signal having a portion which is characterized by a step transition between two values of said test signal, during a first time interval closely following the occurrence of said step transition, comparing the resultant signal at the unknown impedance with said first reference signal to provide a first error signal proportional to the difference between one component of said known impedance, and during a later time interval, comparing the resultant signal at the unknown impedance with said second reference signal to provide a second error signal proportional to the difference between the other component of said unknown impedance and the like component of said known impedance, said later time interval occurring after the transient portion of the resultant signal has subsided.

2. The method of claim 1 wherein said first and second reference signals are derived from the test signal.

3. The method of claim 1 wherein the first and second reference signals are the same signal.

4. A method of comparing an unknown impedance with a known impedance, each of said impedances having a resistive and a reactive component, said method comprising;

providing first and second reference signals, said first reference signal manifesting the transient component of the known impedance and said second reference signal manifesting the steady-state component of the known impedance.

applying a step voltage across said unknown impedance to develop a resultant voltage across said unknown impedance, said resultant voltage having a transient and a steady-state component, during a first time interval closely following the occurrence of the leading edge of the voltage step, comparing the resultant voltage across the unknown impedance with said first reference signal to provide a first error voltage proportional to the difference between one component of said unknown impedance and the like component of said known impedance, and during a later time interval, comparing the resultant voltage across the unknown impedance with said second reference signal to provide a second error voltage proportional to the difference between the other component of said unknown impedance and the like component of said known impedance, said later time interval occurring after the transient portion of the resultant voltage has subsided.

5. The method of claim 4 wherein said first and second reference signals are derived from the step voltage.

6. The method of claim 4 wherein said first and second reference signals are the same signal.

7. A method of comparing an unknown impedance with a known impedance, each of said impedances having a capacitive and inductive component, said method comprising:
providing a first reference signal manifesting one component of said known impedance.
applying a test signal to said unknown impedance to develop a resultant signal at said unknown impedance, said resultant signal being oscillating resonant frequency component, said test signal having a portion which is characterized by a step transition between two values of said test signal, and
during a time interval following the occurrence of said step transition, comparing the resultant signal at the unknown impedance with said reference signal to provide an error signal proportional to the difference between said one component of said unknown impedance and a like component of said known impedance, the only like components of said impedances having substantially the same value.

8. The method of claim 7 wherein said other like components of said impedances have different values, further including the steps of providing a second reference signal manifesting the other component of said known impedance, and switching a resistive component in circuit with said unknown impedance to damp out said oscillatory resonant frequency component, said time interval occurring after the oscillatory components have subsided.

9. The method of claim 7 wherein said reference signal is derived from said test signal.

10. A method of comparing an unknown impedance with a known impedance, said impedances being in circuit with one another, each of said impedances having a resistive and a reactive component, said method comprising:
applying a test signal to the circuit combination of said impedances to develop a resultant signal at each of said impedances, each of said resultant signals having a transient and a steady-state component, said test signal having a portion which is characterized by a step transition between two values of said test signal,
during a first time interval closely following the occurrence of said step transition, comparing the resultant signal at the unknown impedance with the resultant signal at the known impedance to provide a first error signal proportional to the difference between the component of said unknown impedance and the like component of said known impedance, and
during a later time interval, comparing the resultant signal at the unknown impedance with the resultant signal at the known impedance to provide a second error signal proportional to the difference between the other component of said known impedance and the like component of said known impedance, said later time interval occurring after the transient portions of the resultant signals have subsided.

11. A method of comparing an unknown impedance with a known impedance, said impedances being connected in series, each of said impedances having a resistive and a reactive component, said method comprising;
applying a step voltage across the series combination of said impedances to develop a resultant voltage across each of said impedances, each of said resultant voltages having a transient and a steady-state component,
during a first time interval closely following the occurrence of the leading edge of the voltage step, comparing the resultant voltage across the unknown impedance with the resultant voltage across the known impedance to provide a first error voltage proportional to the difference between one component of said unknown impedance and the like component of said known impedance, and
during a later time interval, comparing the resultant voltage across the unknown impedance with the resultant voltage across the known impedance to provide a second error voltage proportional to the difference between the other component of said unknown impedance and the like component of said known impedance, said later time interval occurring after the transient portions of the resultant voltages have subsided.

12. A method of comparing an unknown impedance with a known impedance, said impedances being in circuit with one another, each of said impedances having a capacitive and inductive component, said method comprising:
applying a test signal to the circuit combination of said impedances to develop a resultant signal at each of said impedances, each of said resultant signals being an oscillating resonant frequency component, said test signal having a portion which is characterized by a step transition between two values of said test signal, and
during a time interval following the occurrence of said step transition comparing the resultant signal at the unknown impedance with the resultant signal at said known impedance to provide an error signal proportional to the difference between one component of said known impedance and a like component of said known impedance, the other like components of said impedances having substantially the same value.

13. The method of claim 12 wherein said other like components of said impedances have different values, further including the step of switching a resistive component in circuit with each of said impedances to damp out said oscillatory resonant frequency components, said resistive components having substantially the same value, said time interval occurring after the oscillatory components have subsided.

* * * * *